Patented Apr. 3, 1923.

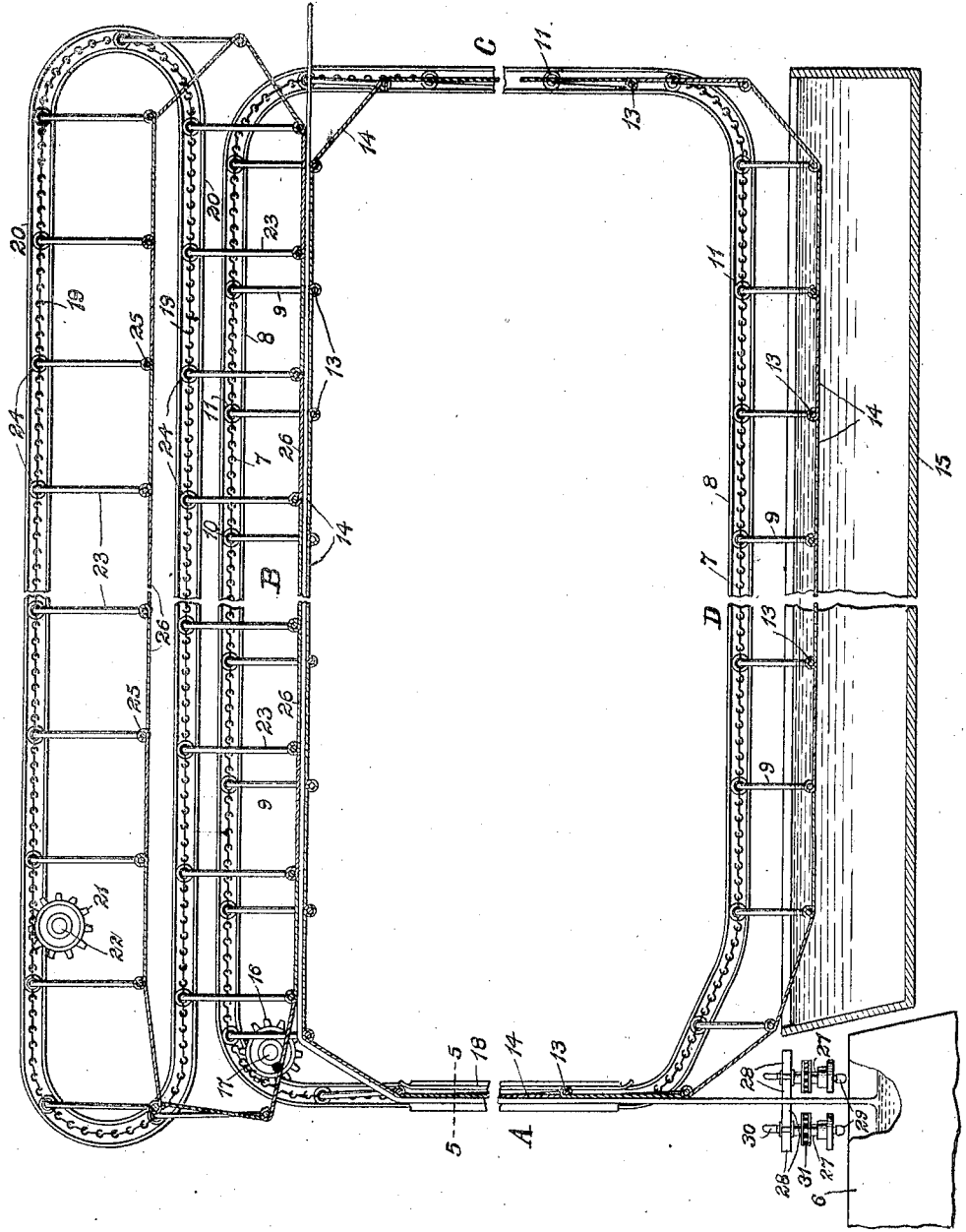

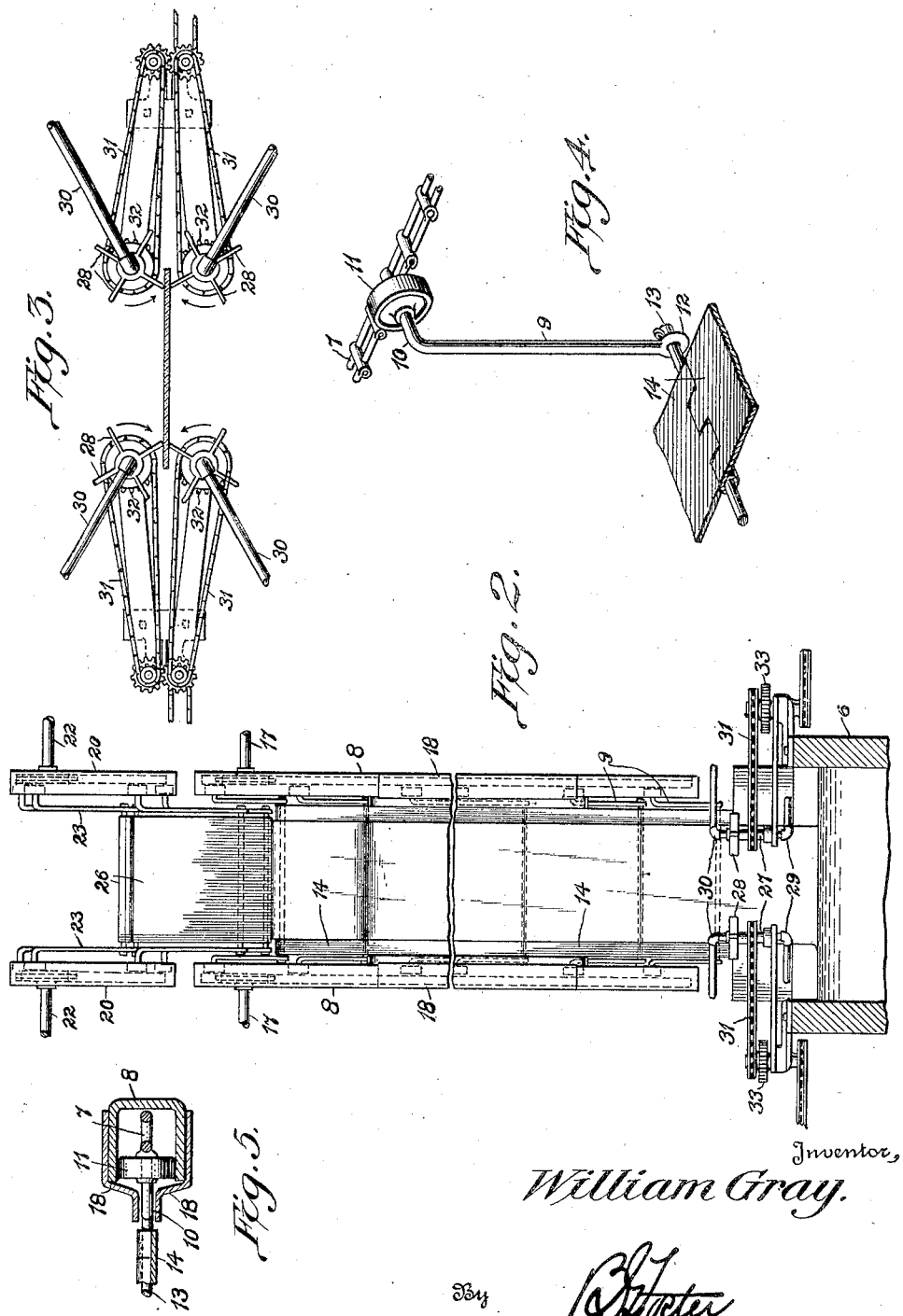

1,450,590

UNITED STATES PATENT OFFICE.

WILLIAM GRAY, OF LANCASTER, OHIO, ASSIGNOR TO THE LIBBEY-OWENS SHEET GLASS COMPANY, OF TOLEDO, OHIO, A CORPORATION OF OHIO.

GLASS-DRAWING APPARATUS.

Application filed July 10, 1920. Serial No. 395,246.

*To all whom it may concern:*

Be it known that I, WILLIAM GRAY, a citizen of the United States, residing at Lancaster, in the county of Fairfield and State of Ohio, have invented certain new and useful Improvements in Glass-Drawing Apparatus, of which the following is a specification.

The present invention relates to apparatus for producing glass sheets, and the object is to provide an apparatus of a relatively simple character for drawing a continuous sheet in flat condition.

In the accompanying drawings:—

Figure 1 is a vertical sectional view through one embodiment of the invention,

Figure 2 is a front elevation of the same,

Figure 3 is a horizontal sectional view,

Figure 4 is a detail perspective view of one of the mountings for the carrier,

Figure 5 is a cross sectional view substantially on the line 5—5 of Figure 1.

In the embodiment disclosed, a portion of a reservoir or tank for molten glass is disclosed at 6, and may be of any desired or well known construction. Located adjacent thereto is drawing means comprising an endless carrier member. The same consists of spaced endless cable members which may be sprocket chains 7 operating in suitable guideways 8 and carrying hangers 9, the hangers having offset pintles 10 on which are journaled rollers 11 operating in said guideways. The free ends of the hangers are provided with eyes 12 in which are mounted transverse pivot rods 13 that connect corresponding hangers of the sprocket chains 7. The pivot rods constitute connections for an endless series of plates 14 that are thus supported by the hangers as shown.

The endless carrier, as thus constructed, has a vertical stretch A located above the reservoir or tank 6, an upper substantially horizontal offtake stretch B, a rear downwardly moving stretch C, and a return stretch D. Located below the stretch D is a tank 15 for a cooling medium, through which the plates 14 pass, as illustrated in Figure 1. The carrier is driven by any suitable means, as for example sprocket wheels 16 mounted on shafts 17, and driven from any suitable source of power, not shown. The vertical stretch A preferably has its hangers operating between guides 18, as shown in Figure 5, which guides serve to hold the plates in vertical alignment during their upward movements.

Flattening means may be associated with the carrier and is preferably constructed as follows: Spaced endless cable members preferably in the form of sprocket chains 19 operate in guideways 20 located above the offtake stretch B and are driven by sprocket wheels 21 mounted on drive shafts 22. The chains 19 have hangers 23 on which are journaled supporting rollers 24 that operate in the guideways 20. The hangers 23 carry transverse pivot rods 25 to which are hinged an endless series of presser plates 26. These plates are adapted to coperate with the plates of the offtake stretch B, as hereinafter explained.

With this structure, it will be noted that a sheet is drawn from the molten glass in the reservoir 6 and rests against the outer faces of the plates of the vertical stretch A of the carrier. This sheet bends, as shown at the upper corner, above the reservoir and rests flat upon the plates of the offtake stretch, being pressed thereupon by the plates 26 of the flattening means, the sheet being carried from this drawing apparatus to other suitable mechanism, not shown, where it may be cut and annealed.

In order to prevent the sheet as it leaves the mass of glass from tapering, suitable spreading or stretching means is employed, preferably constructed as follows: Vertical shafts 27 are journaled on opposite sides of the margins of the sheet and are provided with outstanding radial fingers 28 adapted to successively engage said margins and hold or draw laterally thereupon. These devices are preferably water cooled, having supply pipes 29 connected thereto at one end and outlet pipes 30 at their opposite ends. The shafts may be driven by any suitable means, as for example sprocket chains 31 operating on sprocket wheels 32 and driven through the medium of suitable gearing 33.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new and desire to secure by Letters Patent, is:—

1. In an apparatus for drawing sheet glass, the combination with a reservoir for the melted glass, of an endless sheet carrier comprised of hingedly connected flat plates, having an upwardly moving sheet guiding stretch above the reservoir, and an upper substantially horizontal sheet-supporting stretch continuing from the upward stretch.

2. In an apparatus for drawing sheet glass, the combination with a reservoir for the molten glass, of a sheet drawing and flattening means comprising a series of hingedly connected flat plates, having an upwardly moving sheet guiding and drawing stretch above the reservoir, connecting with an upper substantially horizontal sheet-supporting stretch.

3. In apparatus for drawing glass, the combination with a reservoir for the melted glass, of an endless sheet carrier comprising endless cable members, hangers pivotally connected thereto, and supporting plates pivotally mounted on said hangers.

4. In apparatus for drawing glass, the combination with a reservoir for the melted glass, of an endless sheet carrier comprising endless cable members, hangers connected thereto, and hingedly connected supporting plates mounted on said hangers.

5. In an apparatus for drawing sheet glass, the combination with the reservoir for the melted glass, of endless cable members, means for driving the cables, guides for the cables, an endless series of hingedly connected sheet supporting plates, and hangers pivotally supporting the plates from the cables.

6. In apparatus for drawing glass, the combination with a reservoir for the melted glass, of an endless sheet carrier having an upwardly movable stretch over the reservoir, an upper offtake stretch extending from the upwardly moving stretch, and a cooling tank through which the carrier passes between the offtake and upward stretches thereof.

7. In apparatus for drawing glass, the combination with a reservoir for molten glass, of a drawing apparatus cooperating therewith and comprising an upwardly movable stretch located above the reservoir, an upper offtake stretch, a downwardly movable stretch and a lower return stretch, and a cooling tank through which the return stretch passes.

8. In apparatus for drawing glass, the combination with a reservoir for molten glass, of a drawing apparatus cooperating therewith and comprising spaced endless cable members, hangers carried thereby and an endless set of articulated supporting plates connected to the hangers, said drawing apparatus having an upwardly movable stretch located above the reservoir, an upper offtake stretch, a downwardly movable stretch and a lower return stretch, and a cooling tank through which the return stretch passes.

9. In apparatus for drawing glass, the combination with a reservoir for molten glass, of sheet drawing apparatus located thereover, and oppositely operating mechanisms rotating on axes disposed longitudinally of the sheet and engaging the margins of the sheet between the reservoir and drawing means to maintain a predetermined width to said sheet.

10. In apparatus for drawing sheet glass, the combination with a reservoir for melted glass, of sheet drawing apparatus located thereover, and mechanisms rotating on axes disposed longitudinally of the sheet and engaging the margins of the sheet above the reservoir to maintain a predetermined width to the sheet, and means for maintaining a flow of cooling fluid through the mechanisms.

11. In apparatus for drawing glass, the combination with a reservoir for molten glass, of sheet drawing apparatus located thereover, and devices that rotate on axes disposed longitudinally of the sheet and that grip the opposite margins of the sheet between the drawing apparatus and reservoir, to maintain a predetermined width to said sheet.

12. In apparatus for drawing glass, the combination with a reservoir for molten glass, of sheet drawing apparatus located thereover, and sets of oppositely rotating fingers that engage opposite margins of the sheet between the drawing apparatus and reservoir to maintain a predetermined width to said sheet.

13. In apparatus for drawing glass, the combination with a reservoir for molten glass, of sheet drawing apparatus located thereover, and upright shafts located on opposite sides of the margins of the sheet being drawn and having outstanding fingers that engage said margins between the drawing apparatus and reservoir, to maintain a predetermined width to said sheet.

14. In apparatus for drawing glass, the combination with a reservoir for the melted glass, of an endless sheet carrier having an upwardly movable stretch over the reservoir, an upper offtake stretch extending from the upwardly moving stretch, and flattening means cooperating with the endless sheet carrier.

15. In apparatus for drawing glass, the combination with a reservoir for the melted glass, of an endless sheet carrier having an upwardly movable stretch, over the reservoir, an upper offtake stretch extending from the upwardly moving stretch, and flattening means cooperating with the offtake stretch of the sheet carrier.

16. In apparatus for drawing glass, the combination with a reservoir for the melted glass, of an endless sheet carrier having an upwardly movable stretch over the reservoir, an upper offtake stretch extending from the upwardly moving stretch, and flattening means comprising a movable endless pressing member cooperating with the endless sheet carrier.

17. In apparatus for drawing glass, the combination with a reservoir for the melted glass, of an endless sheet carrier having an upwardly movable stretch over the reservoir, an upper offtake stretch extending from the upwardly moving stretch, and flattening means comprising a movable endless pressing member having a stretch cooperating with the offtake stretch of the sheet carrier.

18. In apparatus for drawing glass, the combination with a reservoir for the melted glass, of an endless sheet carrier having an upwardly movable stretch over the reservoir, a substantially horizontal sheet supporting stretch extending from the upper end of the upwardly moving stretch, and an endless flattening device having a substantially horizontal stretch that overlies the corresponding stretch of the endless carrier.

19. In an apparatus for drawing a continuous sheet of glass, the combination with a reservoir for the melted glass, of an endless series of hingedly connected flat plates, comprising a vertical run above the reservoir and a horizontal run, the glass sheet being drawn up in the vertical run, bent into the horizontal, and carried away horizontally while in contact with the flat plates.

20. In an apparatus for drawing sheet glass, the combination with a reservoir for the melted glass, of means for drawing a continuous sheet of glass vertically therefrom and then bending the sheet into the horizontal plane, comprising two endless series of articulated flat plates, the sheet being guided by one series of plates in its vertical run, and gripped between the two series in its horizontal run.

In testimony whereof, I affix my signature in the presence of two witnesses.

WILLIAM GRAY.

Witnesses:
T. G. NICEWARNER,
P. M. LONG.